United States Patent [19]
Davis, Jr.

[11] Patent Number: 5,003,244
[45] Date of Patent: Mar. 26, 1991

[54] BATTERY CHARGER FOR CHARGING A PLURALITY OF BATTERIES

[75] Inventor: James B. Davis, Jr., Merrimack, N.H.

[73] Assignee: Digital Equipment Corporation, Maynard, Mass.

[21] Appl. No.: 349,309

[22] Filed: May 9, 1989

[51] Int. Cl.$^5$ .............................................. H02J 7/08
[52] U.S. Cl. ....................................... 320/17; 320/39; 307/46
[58] Field of Search ...................... 320/2, 3, 8, 14, 15, 320/17, 18, 20, 39, 40; 307/46, 66, 67

[56] References Cited

U.S. PATENT DOCUMENTS

| | | | |
|---|---|---|---|
| 4,079,303 | 3/1978 | Cox | 320/17 |
| 4,331,911 | 5/1982 | Park | 320/14 |
| 4,340,823 | 7/1982 | Miyazawa | 307/66 |
| 4,468,571 | 8/1984 | Heavey et al. | 307/46 X |
| 4,488,057 | 12/1984 | Clarke | 307/46 X |
| 4,645,995 | 2/1987 | Terrell et al. | 320/2 |
| 4,885,521 | 12/1989 | Crampton | 320/14 |

Primary Examiner—Peter S. Wong
Assistant Examiner—Kristine Peckman
Attorney, Agent, or Firm—Kenyon & Kenyon

[57] ABSTRACT

A battery charging apparatus that charges a plurality of batteries to equal voltage levels. The apparatus has a transformer that acts as a flyback circuit to charge the plurality of batteries. The transformer has a primary winding and a plurality of secondary winding circuits, each secondary winding circuit having a secondary winding and a diode. A different secondary winding circuit is coupled across each battery. The diodes cause only the battery having the lowest voltage among the plurality of batteries to receive energy on a transformer pulse. This occurs until that battery is charged to the level of the next lowest voltage battery, at which time both batteries will receive energy during the pulse. The sequence is followed until all the batteries are charged equally and to a predetermined threshold level.

16 Claims, 1 Drawing Sheet

5,003,244

BATTERY CHARGER FOR CHARGING A PLURALITY OF BATTERIES

FIELD OF THE INVENTION

The present invention relates to the field of battery chargers, and more particularly to a battery charging apparatus which simultaneously charges a plurality of batteries.

BACKGROUND OF THE INVENTION

In order to provide protection against power outages, modern computer systems typically use battery backups. When the AC voltage supplied to the computer drops below a certain voltage level, a trigger circuit will cause a battery voltage to be discharged to the computer. This allows the computer to save its memory during the outage, and if necessary, to perform a graceful shutdown.

Typically, the battery voltage is supplied by a plurality of battery packs, each containing a plurality of battery cells. These batteries are coupled in series to provide the input voltage when the normal input source fails. The battery packs must be kept charged to assure that the battery will be able to supply the proper level of voltage to the computer, when called upon to do so. This function is performed by a battery charger.

In the prior art, battery chargers are known which sense the voltages of the series-coupled battery packs, and then provide a charge to simultaneously raise the voltage levels of each battery pack. The charge will be applied until the voltage of the lowest voltage pack is raised beyond a predetermined threshold voltage level. The problem with this approach is that the battery packs do not often have the same voltage levels before charging. Therefore, when the lowest voltage battery pack is raised to the predetermined threshold level, the other battery packs are potentially charged to much higher voltage levels. In other words, in order to assure that the lowest voltage battery has a minimum voltage level, the prior art battery chargers allow the possibility of the remaining battery packs being charged to too high a level.

There is therefore a need to provide a battery charger that would keep a plurality of battery packs charged to a minimum voltage level, but at the same time assure that these 3-battery packs are each charged to the same voltage levels.

SUMMARY OF THE INVENTION

The present invention satisfies the need for a battery charger which will maintain a plurality of battery packs charged to equal voltage levels. The present invention provides a battery charging apparatus that charges a plurality of batteries to equal voltage levels. The apparatus has a charging voltage supply and a transformer coupled to this voltage supply. The transformer has a primary winding and a plurality of secondary winding circuits. Each secondary winding circuit is coupled across a different one of the batteries and includes a secondary winding and a semiconductor switching element.

The secondary winding circuits act to charge the battery having the lowest voltage first, until its voltage reaches the voltage level of the next lowest voltage battery. At that point, both of these batteries have equal voltages and will be charged. This sequence is continued until all the batteries have equal voltages. The batteries are charged until each one attains a predetermined threshold voltage level. By this invention, equal charging of the batteries is assumed.

The present invention also provides in a computer system, a power supply comprising a primary voltage source, and a battery backup. A trigger circuit senses when the primary voltage drops below a certain level, and triggers an SCR to allow the battery backup to supply power to the computer. The battery backup is kept charged by a battery charger that includes a transformer with a plurality of secondary winding circuits coupled in parallel across individual series-coupled batteries. The secondary winding circuits each include a secondary winding and a diode.

The windings and the diodes act to ensure that the battery or batteries having the lowest voltage will receive energy from the transformer on any particular pulse. After the batteries have been charged to equal levels, they will continue being charged until they all reach a threshold charged voltage, as sensed by a voltage sensor and charge control. This charger control will then reduce the charging rate to a trickle.

BRIEF DESCRIPTION OF THE DRAWINGS

FIG. 1 is a schematic diagram of a battery charging apparatus constructed in accordance with an embodiment of the present invention.

DETAILED DESCRIPTION

Figure 5:
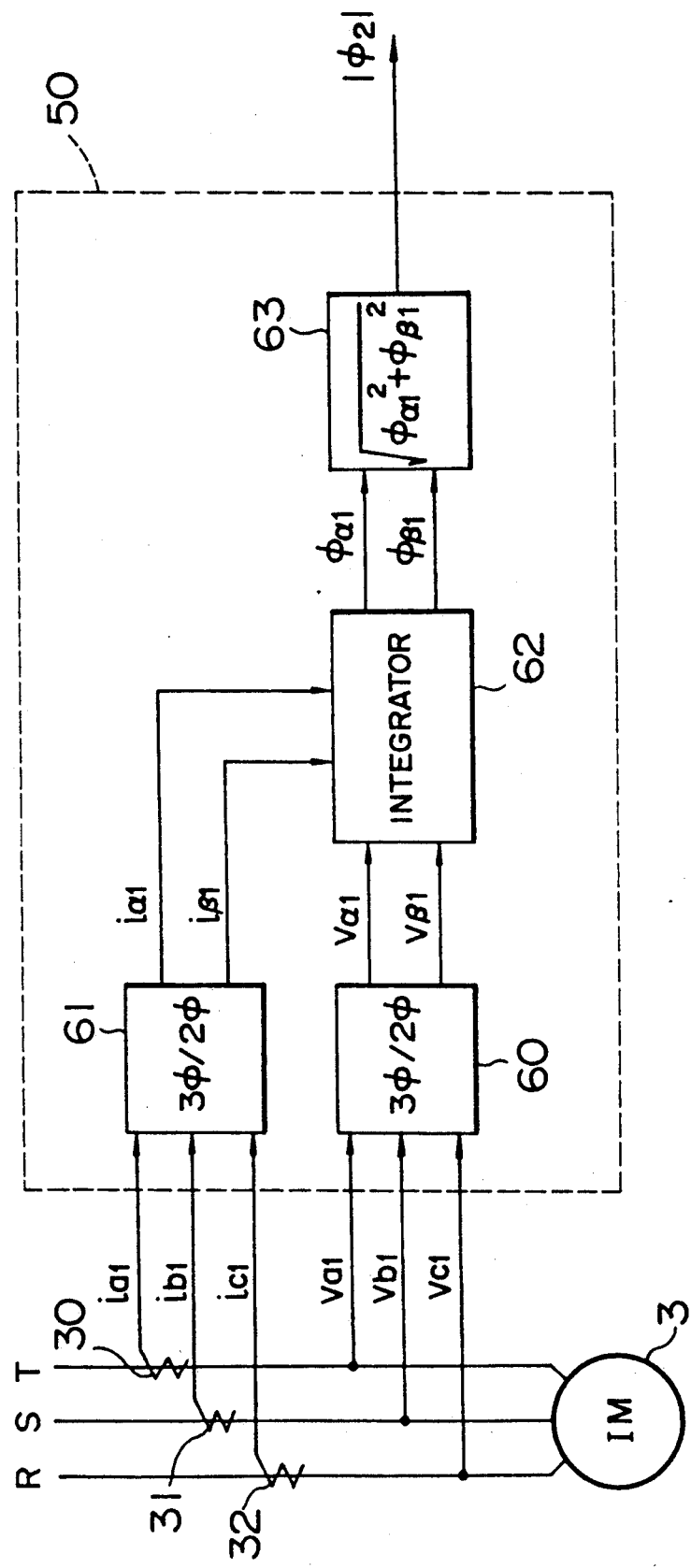

The battery charger apparatus of the present invention is illustrated in FIG. 1. An AC input source provides AC voltage to a bridge 11 connected to an output 12. The output 12 is connectable to a computer 13 to provide it with operating power. The bridge 11 can be a one-phase or three-phase bridge.

Should the AC source 10 fail, power will be supplied to the computer by a plurality of battery packs. In the embodiment of FIG. 1, there are four battery packs 25, 26, 27, and 28. In the illustrated embodiment, each of these battery packs 25-28 are 60 volt battery packs, each containing thirty two-volt battery cells. The battery packs 25-28 are coupled in series to provide 240 volts across capacitor C1 at the output 12.

The battery packs 25-28 are kept charged by a transformer 14 that is connected to a source of DC voltage 30 at the transformer input. The transformer 14 has a single primary winding 16 and four secondary windings 21, 22, 23 and 24. The transformer 14 also has a core 18. Each of the secondary windings 21-24 is connected across a different battery pack, and each will have the same number of turns.

Each secondary winding 21-24 is connected through a diode D1, D2, D3 or D4 to one of the battery packs 25-28. For example, secondary winding 21 is coupled across battery pack 25 through diode D1, and secondary winding 22 is coupled across battery pack 26 by diode D2, etc. A transistor 34 is coupled to the primary winding 16 and is controlled by a voltage sensor and charger control 32. The transformer 14 is used as a flyback circuit, with the transistor 34 being switched at 25 KHz. When transistor 34 is on, the diodes D1-D4 are reverse biased and the secondary windings 21-24 do not conduct. When the transistor 34 is turned off, the secondary windings 21-24 all reverse their polarity and the energy stored in the transformer 14 is transferred to the battery packs 25-28.

As stated before, the secondary windings 21-24 all have equal turns. If the battery pack 25-28 all had equal voltages, the current in all the secondary windings 21-24 would be equal. However, it is more probable that the battery packs 25-28 all have different voltages. When the secondary windings 21-24 try to conduct (transistor 34 is off) the voltage across each secondary winding 25-28 will be the voltage of the lowest voltage battery 25-28. This is because the lowest secondary winding voltage will be reflected on all of the other secondary windings.

Only one diode will be forward biased, this diode being the one that is connected to the battery pack 25-28 that has the lowest voltage. For illustrative purposes, assume that battery pack 26 has the lowest voltage, battery pack 25 the next lowest voltage, battery pack 27 the next lowest voltage, and battery pack 28 the highest voltage of the four battery packs. Since battery pack 26 has the lowest voltage of the battery pack 25-28, its associated diode D2 will be forward biased so that it will conduct and the battery pack 26 will receive all the energy on that particular pulse. The remaining diodes D1, D3, D4 will be reverse biased since their respective secondary windings 21, 23, 24 will all have voltages that are less than the voltage of their battery packs 25, 27, 28.

The voltage on battery pack 26 will increase as it receives energy, until the voltage of battery pack 26 increases to a voltage equal to the next lowest battery pack, battery pack 25 in this example. At this point, when battery packs 26 and 25 have equal voltages, both diodes D1, D2 will be forward biased and will conduct. The two secondary windings 21, 22 will now share the energy in a pulse. The sequence continues until all the battery packs 25-28 are charged to equal voltages and all secondary windings 21-24 are conducting. All the battery packs will then be charged to a predetermined threshold level. This threshold level is detected by a voltage sensor and charger control 32 which is coupled across one of the secondary windings, such as secondary winding 24. Since the voltage across any one of the secondary windings 21-24 will always be equal to the voltage of the lowest battery pack, the voltage sensor and charger control 32 can determine when all of the battery packs have been charged to a required voltage level. When the voltage sensor and charger control 32 detects that each of the battery packs 25-28 has reached a threshold voltage level (for example, 78 volts per battery pack), the control circuit 32 will change the charging rate to a trickle. It does this by controlling the transistor 34. In this manner, the charging scheme acts as a two rate constant current charge.

The discharge of the battery packs 21-24 occurs when an SCR 36 receives a trigger signal from a trigger circuit 38. The trigger circuit 38 will activate the SCR if the AC input voltage source fails. When this occurs, the battery charger is inhibited and the SCR turns on, to cause the 240 volt battery to be dumped into the load at output 12. At a predetermined voltage (for example 57 volts per pack) the load would be shut off and the SCR 36 could recover. When the AC power source returns, the charge cycle would begin all over.

The voltage sensor and charger control 32 and the trigger circuit 38 are conventional circuits, known to those of ordinary skill in the art and are not further illustrated so as not to obscure the invention. Also, different types of batteries can be charged other than four 60 volt battery packs. For example, eight 30 volt batteries could be charged if eight secondary windings and eight diodes are used. The present invention is to be limited only by the terms of the appendant claims.

What is claimed is:

1. A battery charging apparatus for charging a plurality of batteries, comprising:
    a charging voltage supply source;
    a transformer coupled to the charging voltage supply source, said transformer having a primary winding and a plurality of secondary winding circuits;
    wherein each secondary winding circuit is coupled across a different one of a plurality of batteries and includes a secondary winding and a semiconductor switching element;
    wherein all the secondary windings have an equal number of turns;
    a transistor coupled to the primary winding, and a voltage sensor and charger control coupled across one of the secondary windings and to the transistor, said voltage sensor and charger control controlling the switching of the transistor in dependence on voltage sensed across said secondary winding; and
    wherein said voltage supply supplies DC voltage, such that the transformer acts as a flyback circuit.

2. A battery charging apparatus for charging a plurality of batteries, comprising:
    a charging voltage supply source;
    a transformer coupled to the charging voltage supply, said transformer having a primary winding and a plurality of secondary winding circuits;
    wherein each secondary winding circuit is coupled across a different one of a plurality of batteries and includes a secondary winding and a semiconductor switching element; and
    wherein the semiconductor switching element is a diode that conducts when the voltage of the battery that the secondary winding circuit is coupled across is equal to the lowest voltage among the plurality of batteries.

3. A method of charging a plurality of batteries, comprising the steps:
    supplying a charging voltage to a first battery from said plurality of batteries that has the lowest voltage of said plurality of batteries;
    supplying the charging voltage to both the first battery and a second battery only when the first battery has been charged to the voltage level of the second battery, the second battery being the battery that has the next lowest voltage of said plurality of batteries.

4. The method according to claim 3, further comprising the step of sensing the voltage level of the lowest voltage battery of said plurality of batteries and controlling the supplying of charging voltage such that each of said plurality of batteries is charged to a predetermined threshold level.

5. The method of claim 3, further comprising the step of supplying the charging voltage to subsequent batteries of said plurality of batteries having higher voltages as the batteries of said plurality of batteries having lower voltages are charged to the voltage levels of the batteries having higher voltages.

6. The method of claim 3, wherein the step of supplying the charging voltage includes using a transformer as a fly-back circuit, the transformer having a primary winding and a plurality of secondary winding circuits, each secondary winding circuit 7. The method of claim 6, wherein the step of supplying the charging voltage to the batteries includes switching of the semiconductor switching element in one of the secondary winding circuits to conduct when the voltage of the battery that the secondary winding is coupled across is equal to the lowest voltage among the plurality of batteries.

8. A battery charging apparatus for charging a plurality of batteries coupled in series, comprising:
   a charging voltage supply source; and
   a transformer coupled to the charging voltage supply source, said transformer having a primary winding and a plurality of secondary winding circuits with individual secondary winding circuits coupled in parallel across individual batteries, each secondary winding circuit having a secondary winding and a diode that only conducts when the voltage of the battery that the secondary winding is coupled across is equal to the lowest voltage among batteries that the individual secondary winding circuits are coupled in parallel across.

9. The apparatus of claim 8, wherein all the secondary windings have an equal number of turns.

10. The apparatus of claim 8, further comprising a transistor coupled to the primary winding, and a voltage sensor and charger control coupled across one of the secondary windings and to the transistor, said voltage sensor and charger control controlling the switching of the transistor in dependence on the voltage sensed across said one of the secondary windings.

11. The apparatus of claim 10, wherein said voltage supply supplies dc voltage, such that the transformer acts as a fly-back circuit.

12. A battery charging apparatus for charging a plurality of batteries, comprising:
   means for supplying a charging voltage for a first battery from a plurality of batteries that has the lowest voltage of a plurality of batteries; and
   means for supplying the charging voltage to both the first battery and a second battery only when the first battery has been charged to the voltage level of the second battery, the second battery being the battery that has the next lowest voltage of a plurality of batteries.

13. The apparatus of claim 12, further comprising a voltage sensor which senses the voltage level of the lowest voltage battery of a plurality of batteries in controlling the supplying of charging and voltage such that each of the plurality of batteries is charged to a predetermined threshold level.

14. The apparatus of claim 12, wherein the means for supplying a charging voltage to the first battery includes a transformer operated as a fly-back circuit, the transformer having a primary winding and a plurality of secondary winding circuits, each secondary winding circuit being coupled across a different one of the plurality of batteries.

15. The method of claim 14, wherein the means for supplying the charging voltage to both the first battery and the second battery only when the first battery has been charged to the voltage level of the second battery includes a semiconductor switching element and a secondary winding in each of the secondary winding circuits 16. In a computer system having a computer, the power supply comprising:
   a primary source of voltage coupled to the computer;
   a battery backup having a plurality of series-coupled batteries switchably coupled to the computer;
   a semiconductor-controlled rectifier coupled between the battery backup and the computer;
   a trigger circuit coupled to the semiconductor-controller rectifier to trigger the semiconductor-controlled rectifier when the primary source of voltage drops below a certain level; and
   a battery charger coupled to the battery backup which charges the battery backup, said battery charger including a charging voltage supply source, and a transformer coupled to the charging voltage supply source, said transformer having a primary winding and a plurality of secondary winding circuits with individual secondary winding circuits coupled in parallel across individual batteries of said plurality of series-coupled batteries, each secondary winding circuit having a secondary winding and a diode that only conducts when the voltage of the battery across which the secondary winding is coupled is equal to the lowest voltage among the plurality of series-coupled batteries.

* * * * *